(12) United States Patent
Shin

(10) Patent No.: US 9,869,860 B2
(45) Date of Patent: Jan. 16, 2018

(54) APPARATUS AND METHOD FOR CONTROLLING HEAD UP DISPLAY

(71) Applicant: Hyundai Motor Company, Seoul (KR)

(72) Inventor: Hee Won Shin, Daejeon (KR)

(73) Assignee: Hyundai Motor Company, Seoul (KR)

( * ) Notice: Subject to any disclaimer, the term of this patent is extended or adjusted under 35 U.S.C. 154(b) by 395 days.

(21) Appl. No.: 14/673,449

(22) Filed: Mar. 30, 2015

(65) Prior Publication Data

US 2016/0107573 A1 Apr. 21, 2016

(30) Foreign Application Priority Data

Oct. 17, 2014 (KR) .................... 10-2014-0140718

(51) Int. Cl.
*B60R 1/00* (2006.01)
*G02B 27/01* (2006.01)

(52) U.S. Cl.
CPC ........ *G02B 27/01* (2013.01); *G02B 2027/014* (2013.01); *G02B 2027/0138* (2013.01); *G02B 2027/0141* (2013.01)

(58) Field of Classification Search
CPC ....... B60R 1/00; B60R 2300/10; G02B 27/01; G02B 202/014; G02B 2027/0138
See application file for complete search history.

(56) References Cited

U.S. PATENT DOCUMENTS

| 2010/0030462 | A1* | 2/2010 | Iwaji | G01C 21/3632 701/533 |
| 2010/0156616 | A1* | 6/2010 | Aimura | G06T 7/593 340/436 |
| 2010/0292895 | A1* | 11/2010 | Nakamura | G08G 1/09623 701/41 |
| 2013/0082874 | A1* | 4/2013 | Zhang | G01S 5/0072 342/357.31 |

FOREIGN PATENT DOCUMENTS

| JP | 2005-265494 A | 9/2005 |
| JP | 2011-203643 | 10/2011 |
| KR | 10-2012-0133309 A | 12/2012 |
| KR | 2013-0024459 | 3/2013 |
| KR | 10-1316353 | 10/2013 |
| KR | 2014-0071174 | 6/2014 |

* cited by examiner

*Primary Examiner* — Huy T Nguyen
(74) *Attorney, Agent, or Firm* — Mintz Levin Cohn Ferris Glovsky and Popeo, P.C.; Peter F. Corless

(57) ABSTRACT

An apparatus for controlling a head up display includes: a memory configured to store first road information of a road on which a vehicle is being driven; a camera configured to obtain image data of the road in front of the vehicle; a control module configured to obtain second road information of the road by analyzing the image data of the front and extracting a plurality of points based on the first road information and the second road information; and an output module configured to output the plurality of points on a viewing area of a wind shield of the vehicle.

18 Claims, 8 Drawing Sheets

APPARATUS AND METHOD FOR CONTROLLING HEAD UP DISPLAY

CROSS-REFERENCE TO RELATED APPLICATION

This application claims the benefit of and priority to Korean Patent Application No. 10-2014-0140718, filed on Oct. 17, 2014 in the Korean Intellectual Property Office, the disclosure of which is incorporated herein in its entirety by reference.

TECHNICAL FIELD

Various embodiments of the present disclosure relate to an apparatus and a method for controlling a head up display, and more particularly, to an apparatus and a method for controlling a head up display that outputs road information in the case in which the road information is not displayed on a viewing area due to a state of a road on which a vehicle is being driven and a driving state.

BACKGROUND

A head up display (HUD) device, which is a system first introduced in fighter planes, provides flight information to a pilot. Currently, the HUD device is provided in general vehicles so that a driver may drive the vehicle while simultaneously checking driving information and road information that are irradiated on a specific area (hereinafter, referred to as a viewing area) of a wind shield of the vehicle. This way, the driver watches the road on which the vehicle is being driven while also viewing the driving information and the road information on the wind shield of the vehicle.

The HUD device may reflect image data on the viewing area so that the driving driver may check the image data including the driving information of the vehicle and the road information. However, in a situation in which a curvature of the driving road is of a certain threshold or more, the vehicle is suddenly turned, or the like, the road information may not be properly output on the viewing area.

SUMMARY

The present disclosure has been made to solve the above-mentioned problems occurring in the related art while advantages achieved by the prior art are maintained intact.

An aspect of the present disclosure provides an apparatus and a method for controlling a head up display capable of outputting corrected road information on a viewing area by correcting road information, in order to prevent a case in which the road information is not properly displayed on the viewing area due to a curvature of a road on which a vehicle is being driven, a turn of the vehicle, and the like.

According to embodiments of the present disclosure, an apparatus for controlling a head up display includes: a memory configured to store first road information of a road on which a vehicle is being driven; a camera configured to obtain image data of the road in front of the vehicle; a control module configured to obtain second road information of the road by analyzing the image data and extracting a plurality of points based on the first road information and the second road information; and an output module configured to output the plurality of points on a viewing area of a wind shield of the vehicle.

The apparatus may further include a sensor module including a location sensor checking location information of the vehicle.

The control module may be further configured to extract information of the first road information corresponding to the location information and to match the extracted information to the second road information when the first road information and the second road information are not matched.

The control module may be further configured to check whether one or more points which are not output on the viewing area are present among the plurality of points.

The control module may be further configured to generate a corrected point by at least one point output on the viewing area when one or more points which are not output on the viewing area are present among the plurality of points.

The control module may be further configured to control the output module and cause the output module to output the corrected point on the viewing area.

Furthermore, according to embodiments of the present disclosure, a method for controlling a head up display includes: extracting first road information of a road on which a vehicle is being driven from prestored road information; obtaining second road information of the road by analyzing image data of the road in front of the vehicle; extracting a plurality of points based on the first road information and the second road information; and outputting the plurality of points on a viewing area of a wind shield of the vehicle.

The method may further include, after the obtaining of the second road information, obtaining location information of the vehicle.

The method may further include, before the extracting of the plurality of points: extracting information of the first road information corresponding to the location information; and matching the extracted information to the second road information when the first road information and the second road information are not matched.

The outputting of the plurality of points may include checking whether one or more points which are not output on the viewing area are present among the plurality of points.

The method may further include, after the checking of whether the one or more points are present among the plurality of points, generating a corrected point by at least one point output on the viewing area when one or more points which are not output on the viewing area are present among the plurality of points.

In the outputting of the plurality of points, the one or more points and the corrected point may be output on the viewing area.

Furthermore, according to embodiments of the present disclosure, a non-transitory computer readable medium containing program instructions for controlling a head up display includes: program instructions that extract first road information of a road on which a vehicle is being driven from prestored road information; program instructions that obtain second road information of the road by analyzing image data of the road in front of the vehicle; program instructions that extract a plurality of points based on the first road information and the second road information; and program instructions that output the plurality of points on a viewing area of a wind shield of the vehicle.

The computer readable medium may further include program instructions that obtain location information of the vehicle, after the second road information is obtained.

The computer readable medium may further include program instructions that extract information of the first road information corresponding to the location information and match the extracted information to the second road information when the first road information and the second road information are not matched, before the extracting of the plurality of points.

The computer readable medium may further include program instructions that check whether one or more points which are not output on the viewing area are present among the plurality of points.

The computer readable medium may further include program instructions that generate a corrected point by at least one point output on the viewing area when one or more points which are not output on the viewing area are present among the plurality of points, after the checking of whether the one or more points are present among the plurality of points.

The computer readable medium may further include program instructions that output the one or more points and the corrected point on the viewing area.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
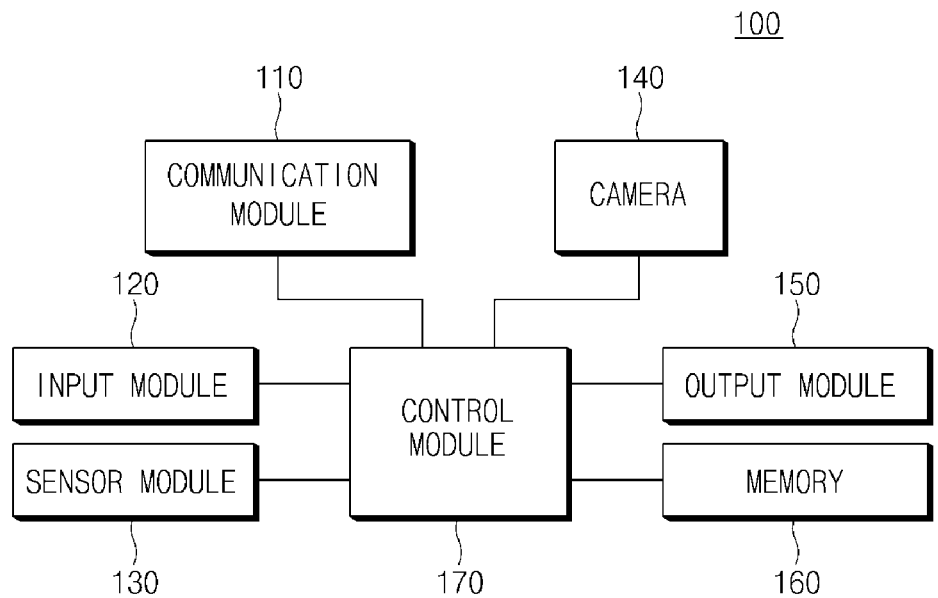
FIG. 1 is a block diagram illustrating main configurations of an apparatus for controlling a head up display according to embodiments of the present disclosure.

Hereinafter, embodiments of the present disclosure will be described with reference to the accompanying drawings. Since the present disclosure may be variously modified and have several embodiments, specific embodiments will be shown in the accompanying drawings and be described in detail in a detailed description. However, it is to be understood that the present disclosure is not limited to the specific embodiments, but rather, includes all modifications, equivalents, and/or substitutions included in the spirit and the scope of the present disclosure. In relation to a description of the drawings, similar components will be denoted by similar reference numerals.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control module. The term "control module" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control module in conjunction with other components.

Furthermore, the control module of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a block diagram illustrating main configurations of an apparatus for controlling a head up display according to embodiments of the present disclosure.

Referring to FIG. 1, an apparatus 100 for controlling a head up display according to the present disclosure may include a communication module 110, an input module 120, a sensor module 130, a camera 140, an output module 150, a memory 160, and a control module 170. In this case, the head up display according to the present disclosure may be a head up display that provides an augmented reality service.

The communication module 110 may perform various intra-vehicle communications such as controller area network (CAN), CAN with flexible data rate (CAN-FD), FlexRay, media oriented systems transport (MOST), time triggered ethernet (TT ethernet), and the like in order to perform communication among the input module 120, the sensor module 130, the camera 140, the output module 150, the memory 160, and the control module 170.

The input module 120 generates a control signal in response to an input from the outside. To this end, the input module 120 may be formed by an input device such as a keypad, a touch pad, a touchscreen, or the like, and in the input module 120 is formed by the touchscreen, the input module may simultaneously perform a function of the output module 150 as well.

The sensor module 130 is included in a vehicle so as to measure driving information of the vehicle, and provides the measured driving information to the control module 170 through the communication module 110. The sensor module 130 may include a speed sensor capable of checking a speed of the vehicle, a global positioning sensor (GPS) capable of checking a location of the vehicle, and the like.

The camera 140 may be included in the vehicle so as to obtain image data for a front of a road on which the vehicle is being driven (e.g., in front of the vehicle). The camera 140 may provide the obtained image data to the control module 170.

The output module 150 is the head up display, wherein the point output to the output module 150 by a control of the control module 170 may be reflected by the viewing area formed on a wind shield of the vehicle so as to be viewed to a driver. In this case, the point may be a driving guide by a curvature of the road on which the vehicle is being driven. The output module 150 may output a screen upon operating the apparatus 100 for controlling the head up display by the control of the control module 170 and may output image data for the driving information. To this end, the output module 150 may be formed by an output device such as a liquid crystal display (LCD), a touchscreen, or the like.

The memory 160 may store a program for operating the apparatus 100 for controlling the head up display, and the like. Particularly, the memory 160 may store the road information capable of checking first road information depending on location information of the vehicle. In this case, the first road information may be a kind of roads on which the vehicle is being driven (e.g., one-way road or two-way road), the number of lanes (e.g., heading direction and opposing direction), a lane (e.g., a lane on which the vehicle is being driven among 6 lanes), an inclination of the road (e.g., gradient of the road), a curvature of the road, a width of the road, a plurality of points indicating an intermediate point of the width of the road, and the like. The memory 160 may store the image data of the road on which the vehicle is being driven, obtained by the camera 140 and may store second road information checked from the image data. The second road information may include a lane on which the vehicle is being driven (e.g., a lane on which the vehicle is being driven among 6 lanes), a curvature of the road, a width of the road, a plurality of points indicating an intermediate point of the width of the road, and the like.

The memory 160 may store specific shape and size of the viewing area and may store information for a matching area which is set from the viewing area according to the control of the control module 170. The matching area may be set by an image projection distance and a heading angle. The image projection distance may be a distance from the vehicle to a point at which an image of a front of the vehicle starts to be output on the viewing area, and the heading angle may be a steering angle of the vehicle.

The control module 170 may check the location information of the driving vehicle by controlling the sensor module 130 and may check the first road information for a road corresponding to the checked location information from the road information stored in the memory 160. The control module 170 may obtain the second road information of the driving road by analyzing the image data obtained by the camera 140 and may extract a plurality of points from the road on which the vehicle is being driven by using the first road information and the second road information. The control module 170 may provide the points to the output module 150 so that the extracted points are output on the viewing area, which is a specific area of the wind shield.

The control module 170 may check the location information of the vehicle from a GPS sensor included in the sensor module 130 when the apparatus 100 for controlling the head up display is powered on. The control module 170 may check the first road information for the road corresponding to the checked location information from the road information stored in the memory 160. The control module 170 may check the second road information of the road on which the vehicle is being driven by analyzing the image data obtained by the camera 140.

The control module 170 may recognize that the information on the road on which the vehicle is being driven, checked by the sensor module 130 is incorrect when locations of the plurality of points checked from the first road information and the plurality of points checked from the second road information are different from each other. The control module 170 may change locations of the plurality of points checked from the first road information to locations of the plurality of points checked from the second road information.

The control module 170 may extract a plurality of points (i.e., points checked based on the second road information) checked from the road on which the vehicle is being driven. The control module 170 may extract the points as much as the number of points that are intended to be included in the matching area generated based on the viewing area. For example, the control module 170 may check the second road information using the image data obtained by the camera 140. The control module 170 may generate a plurality of virtual matching areas. The plurality of matching areas may be generated by uniformly dividing up to a critical distance of the front of the vehicle from a point at which an image of the front of the vehicle starts to be output on the viewing area. The control module 170 may check the point by checking the first road information up to the critical distance of the front of the vehicle in the memory 160. The control module 170 may set the number of points that may be included in a length direction of one matching area, for example, a length of the same direction as a driving direction of the vehicle. In this case, the plurality of points that may be included in the length of the matching area may be set at the same interval. Five points set so as to be included in the matching area may be output on the viewing area upon driving of the vehicle.

The control module 170 may check whether the road on which the vehicle is being driven is the flat road or the slop road when setting the matching area. In the case in which the road on which the vehicle is being driven is the flat road, the control module 170 may check a coordinate value of a point located at a start point of the matching area. In this case, the coordinate value of the point may be a latitude value, a longitude value, and an altitude value, and the control module 170 may set the matching area by calculating a new coordinate value based on the point. The matching area may be formed in a trapezoidal shape, and the control module 170 may set a coordinate value of each vertex of the matching area which is formed in the trapezoidal shape.

In the case in which the road on which the vehicle is being driven is the slop road, the control module 170 may set the matching area by calculating a new coordinate value based on the point located at the checked start point. In this case, upon calculating the new coordinate value for setting the matching area, a gradient (theta) value of the road may be used.

The control module 170 may check whether or not all the extracted five points are included in the matching area. According to embodiments, in the case in which all the points are included in the matching area, it may be checked that all the five points may be output on the viewing area. In the case in which all the five points are included in the matching area, the control module 170 may control the output module 150 to allow all the points to be output on the viewing area.

According to embodiments, in the case in which some or all of the five points are not included in the matching area, that is, in the case in which some or all of the points may not be output on the viewing area, the control module 170 may perform a correction using the points which are not included in the matching area. The control module 170 may correct the points by generating a virtual point between at least two points included in the matching area among the five points. To this end, the control module 170 may use a linear interpolation method, a polynominal interpolation method, a spline interpolation method, or the like. The control module 170 may control the output module 150 so as to display the corrected point and at least two points included in the matching area.

According to embodiments, in the case in which only one point is included in the matching area, the control module 170 may generate a new virtual point between the point included in the matching area and the point which is not included in the matching area and is checked from the second road information by using the linear interpolation method. The control module 170 may control the output module 150 so as to display the virtual point generated as described above and the point which is checked from the second road information and included in the matching area.

According to embodiments, in the case in which all the extracted points are not included in the matching area because the curvature of the road on which the vehicle is being driven is the threshold or more, the control module 170 may generate a guide point capable of guiding the driving direction of the vehicle. In the case in which the point checked from the second road information is not included in the matching area, the control module 170 may check a boundary line of a lane using the image data obtained by the camera 140. The control module 170 may generate the guide point based on the checked boundary line of the lane. The control module 170 may control the output module 150 so as to display the generated guide point on the viewing area.

Figure 2:
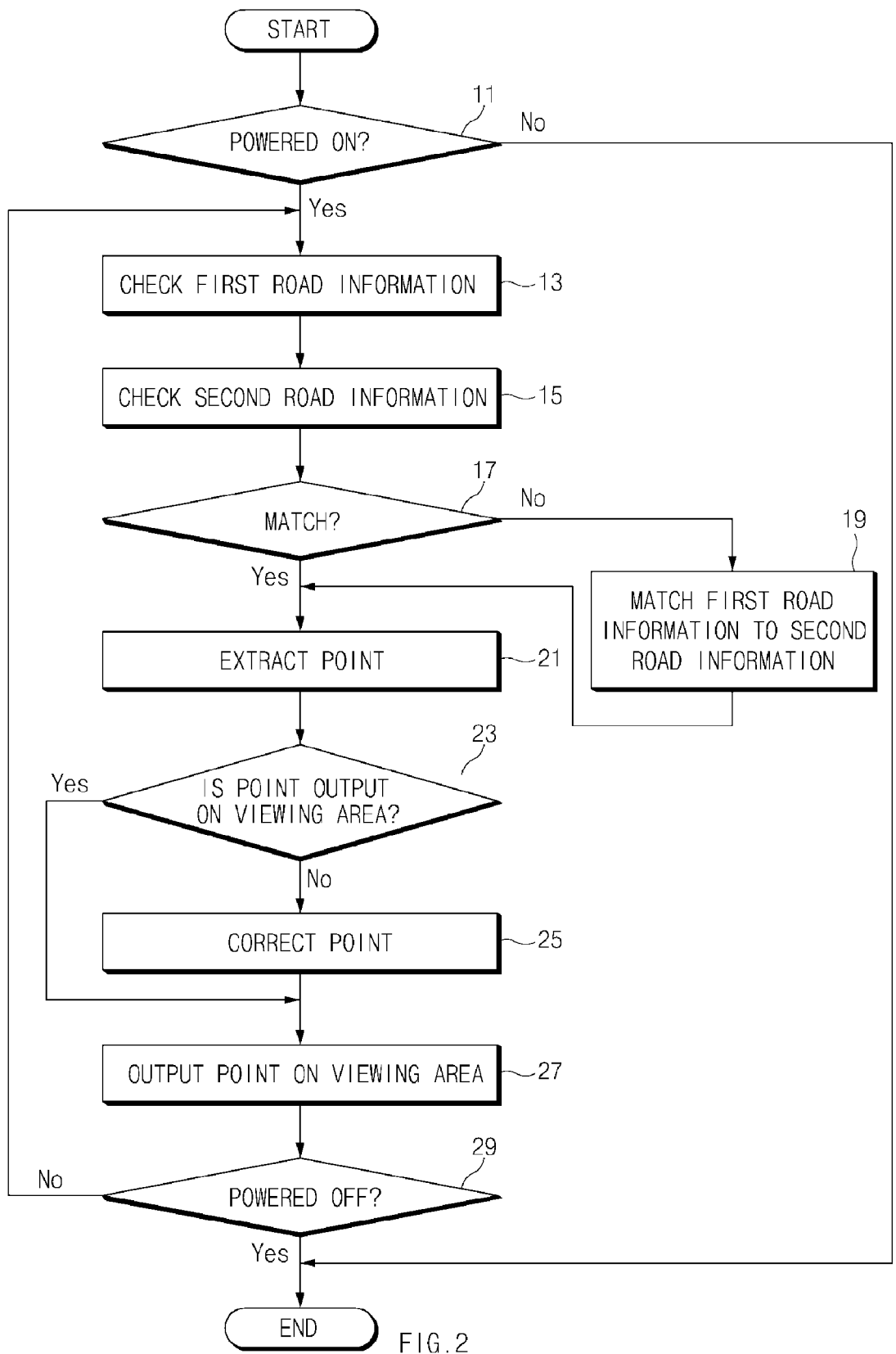
FIG. 2 is a flowchart for describing a method for controlling a head up display according to embodiments of the present disclosure.

FIG. 2 is a flowchart for describing a method for controlling a head up display according to embodiments of the present disclosure.

Referring to FIGS. 1 and 2, in step 11, the control module 170 may check that the apparatus 100 for controlling the head up display is powered on. As a result of the check of step 11, if the apparatus 100 for controlling the head up display is powered on, the process proceeds to step 13, and if it is not checked that the apparatus 100 for controlling the head up display is powered on, the apparatus 100 for controlling the head up display may end.

In step 13, the control module 170 may check the first road information. The control module 170 may check the location information of the vehicle from the GPS sensor included in the sensor module 130 by controlling the sensor module 130. The control module 170 may check the first road information for the road corresponding to the checked location information from the road information stored in the memory 160. The first road information may include a kind of roads on which the vehicle is being driven (e.g., one-way road or two-way road), the number of lanes (e.g., heading direction and opposing direction), a lane (e.g., a lane on which the vehicle is being driven among 6 lanes), an inclination of the road (e.g., gradient of the road), a curvature of the road, a width of the road, a plurality of points indicating an intermediate point of the width of the road, and the like.

In step 15, the control module 170 may check the second road information. The control module 170 may check the second road information of the road on which the vehicle is being driven by analyzing the image data obtained by the camera 140. The second road information may include a lane on which the vehicle is being driven (e.g., a lane on which the vehicle is being driven among 6 lanes), a curvature of the road, a width of the road, a plurality of points indicating an intermediate point of the width of the road, and the like.

In step 17, the control module 170 may check whether or not the first road information and the second road information are matched. As a result of the check of step 17, if the first road information and the second road information are not matched, the process proceeds to step 19, and if the first road information and the second road information are matched, the process proceeds to step 21. In step 19, the control module 170 may match the first road information to the second road information. For example, the control module 170 may recognize that the information on the road on which the vehicle is being driven, checked by the sensor module 130 is incorrect when locations of the plurality of points checked from the first road information and the plurality of points checked from the second road information are different from each other. The control module 170 may change locations of the plurality of points checked from the first road information to locations of the plurality of points checked from the second road information.

In step 21, the control module 170 may continuously extract a plurality of points (i.e., points checked based on the second road information) checked from the road on which the vehicle is being driven. In this case, the control module 170 may set a virtual matching area capable of displaying the point on the viewing area, based on the viewing area. In this case, the matching area may be displayed in the image data obtained by the camera 140. The viewing area, which is an area on which the image data is shown on the wind shield, may have specific shape and size. The matching area may be set by an image projection distance and a heading angle. The image projection distance may be a distance from the vehicle to a point at which an image of a front of the vehicle starts to be output on the viewing area, and the heading angle may be a steering angle of the vehicle.

Figure 3:
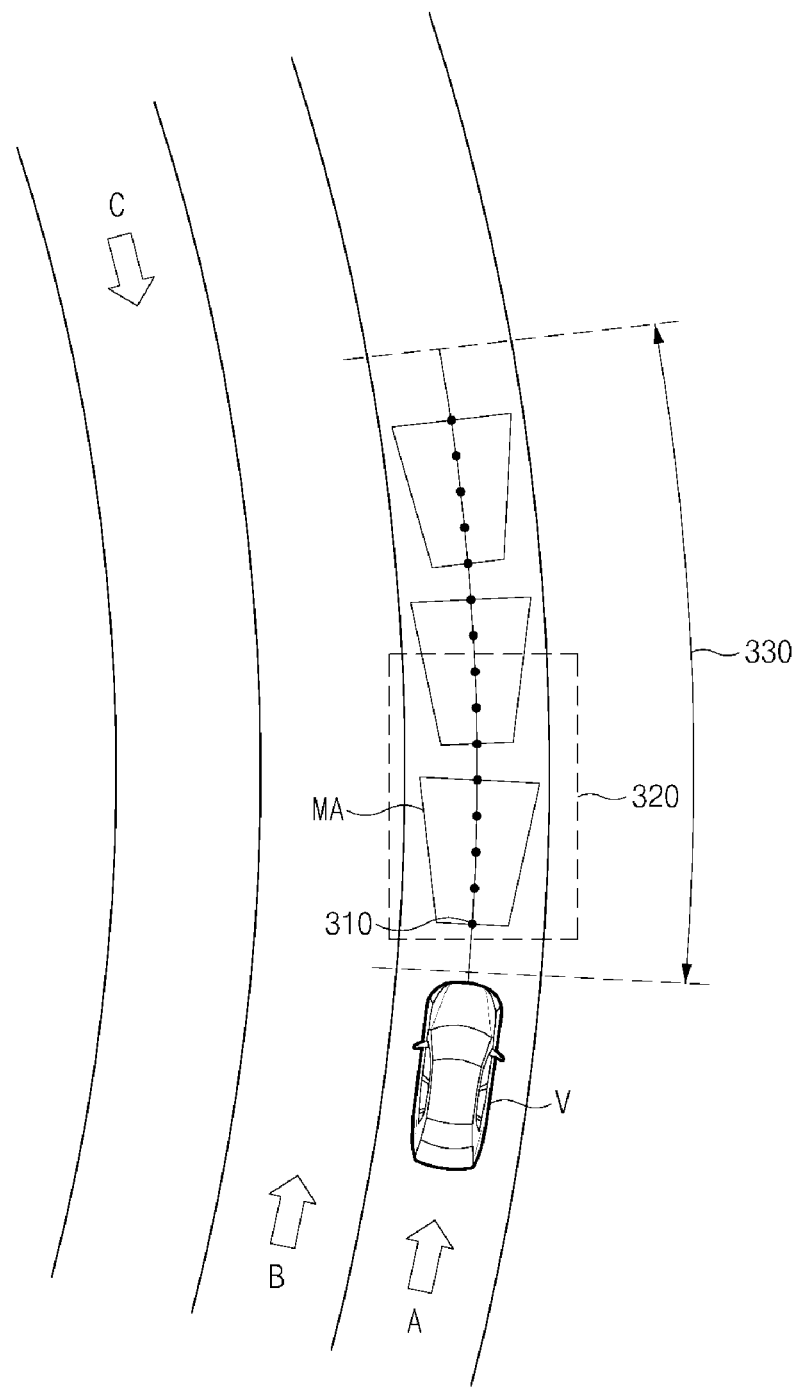
FIG. 3 is a diagram for describing a method for extracting points which are output on a viewing area of the head up display upon driving on a curve road, according to embodiments of the present disclosure.

The control module 170 may extract the points as much as the predetermined number of points that may be included in the matching area. FIG. 3 is a diagram for describing a method for extracting points which are output on a viewing area of the head up display upon driving on a curve road, according to embodiments of the present disclosure. Referring to FIG. 3, the control module 170 may check a lane A of a road on which a vehicle V is being driven, a heading direction of the vehicle, a width of the lane A, and a plurality of points 310 indicating a center of the width. As shown in FIG. 3, the control module 170 may generate a plurality of matching areas MA. In this case, the plurality of matching areas MA may be generated by uniformly dividing up to a critical distance 330 of the front of the vehicle from a point at which an image of the front of the vehicle starts to be output on the viewing area. The control module 170 may check the points 310 by checking the road information up to the critical distance 330 of the front of the vehicle in the memory 160. As shown in FIG. 3, the control module 170 may perform a setting so that five points 310 are included in one matching area MA. The five points 310 included in the matching area MA may be output on the viewing area upon driving of the vehicle.

Figure 4:
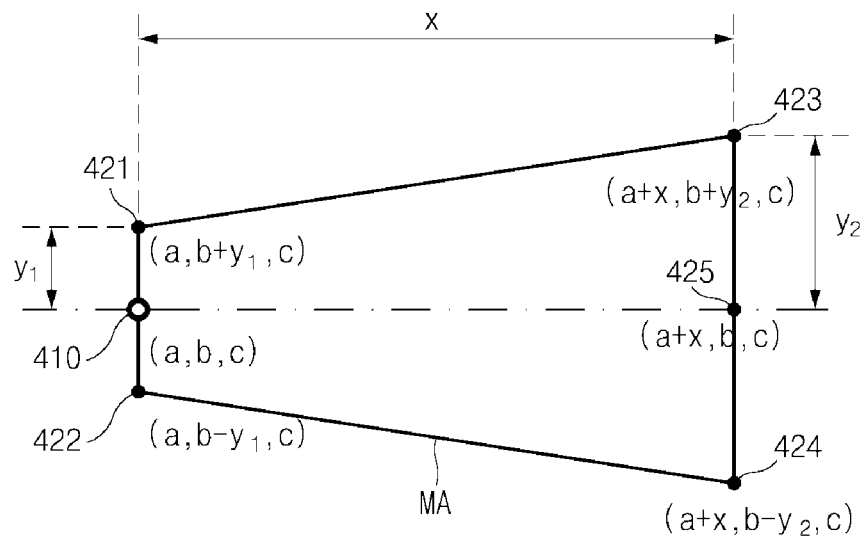
FIG. 4 is a diagram for describing a method for setting a matching area on a flat road according to embodiments of the present disclosure.
Figure 5:
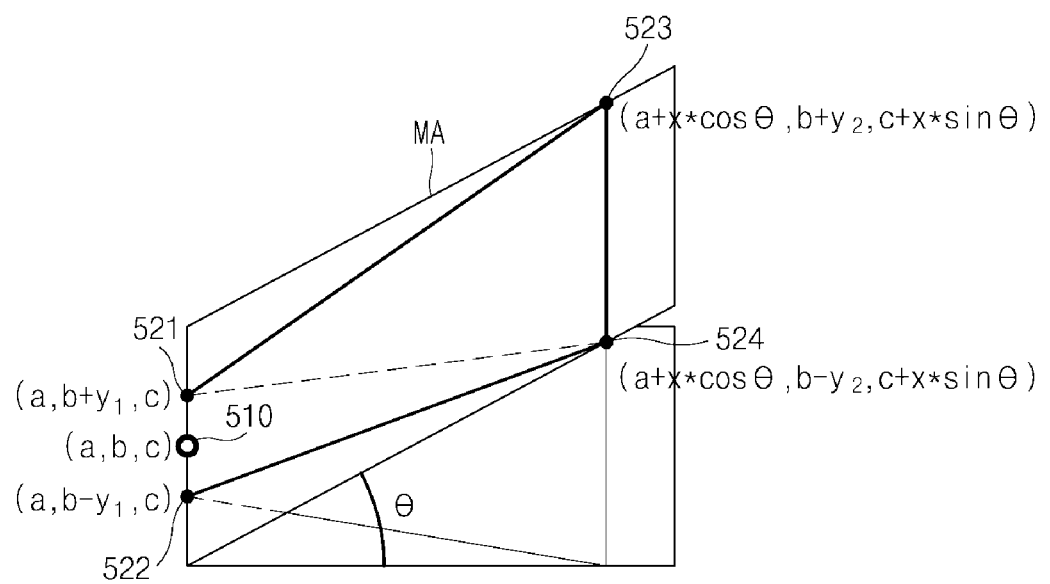
FIG. 5 is a diagram for describing a method for setting a matching area on a slop road according to embodiments of the present disclosure.

FIG. 4 is a diagram for describing a method for setting a matching area on a flat road according to embodiments of the present disclosure. FIG. 5 is a diagram for describing a method for setting a matching area on a slop road according to embodiments of the present disclosure. As shown in FIG. 4, in the case in which the road on which the vehicle is being driven is the flat road, the control module 170 may check a coordinate value of a point 410 located at a start point of the matching area MA. In this case, the coordinate value of the point 410 may be (a, b, c), wherein a may be a latitude value, b may be longitude value, and c may be an altitude value. The control module 170 may set the matching area MA by calculating coordinate values for 421, 422, 423, 434, and 425 based on the point 410. In this case, values of x, y1, and y2 may be data which is preset based on the viewing area.

As shown in FIG. 5, in the case in which the road on which the vehicle is being driven is the slop road, the control module 170 may check a coordinate value of a point 510 located at a start point of the matching area MA. In this case, the coordinate value of the point 510 may be (a, b, c), wherein a may be a latitude value, b may be longitude value, and c may be an altitude value. The control module 170 may set the matching area MA by calculating coordinate values for 521, 522, 523, and 524 based on the point 510. In this case, values of x, y1, and y2 may be data which is preset based on the viewing area, and a theta value may be a gradient of the road on which the vehicle is being driven, checked from at least one road information of the first road information and the second road information.

In step 23, the control module 170 may check whether or not all the extracted five points are included in the matching area. In this case, in the case in which all the points are included in the matching area, it may be checked that all the five points may be output on the viewing area. As a result of the check of step 23, if all the five points may be output on the viewing area, the control module 170 may proceed to step 27. In step 27, the control module 170 may output the five points on the viewing area of the driving vehicle.

As a result of step 23, in the case in which some or all of the five points are not included in the matching area, that is, in the case in which some or all of the points may not be output on the viewing area, the control module 170 may proceed to step 25. Since the matching area is formed in a straight direction from the vehicle, the points may not be included in the matching area in the case in which the vehicle is driven on a road having a curve or is driven while being turned at a predetermined angle or more.

In step 25, the control module 170 may perform a correction using the points which are not included in the matching area. According to embodiments, the control module 170 may correct the points by generating a virtual point between at least two points included in the matching area among the five points. To this end, the control module 170 may use a linear interpolation method, a polynominal interpolation method, a spline interpolation method, or the like. In step 27, the control module 170 may display the corrected points, for example, the virtual point generated between the at least two points in step 25 and the points extracted in step 21 on the viewing area.

Figure 6:
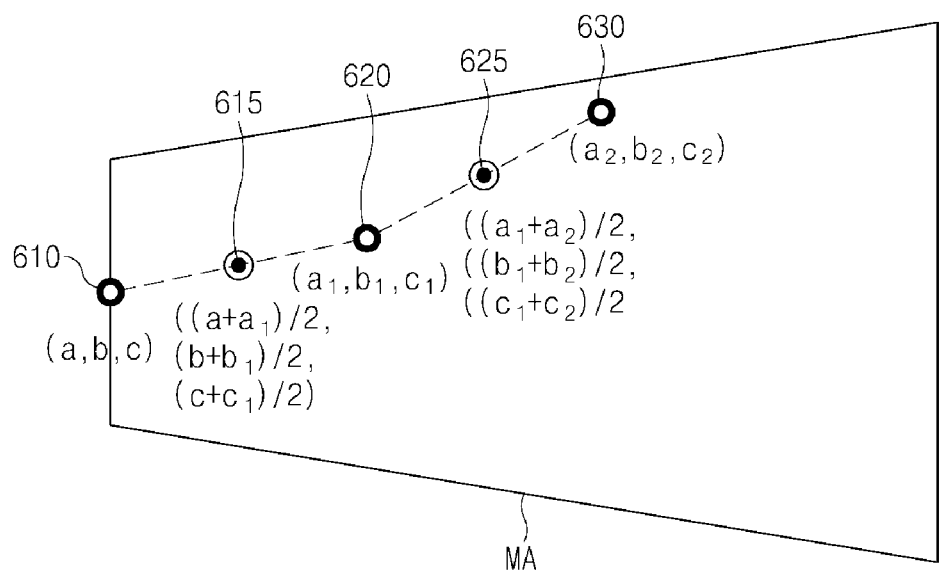
FIG. 6 is a diagram for describing a method for correcting a point according to embodiments of the present disclosure.

FIG. 6 is a diagram for describing a method for correcting a point according to embodiments of the present disclosure. Referring to FIG. 6, the control module 170 may check that three points 610, 620, and 630 are included in the matching area MA. The control module 170 may generate a new virtual point 615 between points corresponding to 610 and 620 and may generate a new virtual point 625 between points corresponding to 620 and 630, by using the linear interpolation method. The control module 170 may display the virtual points 615 and 625 generated as described above and the points 610, 620, and 630 which are checked from the second road information and included in the matching area MA on the viewing area.

Figure 7:
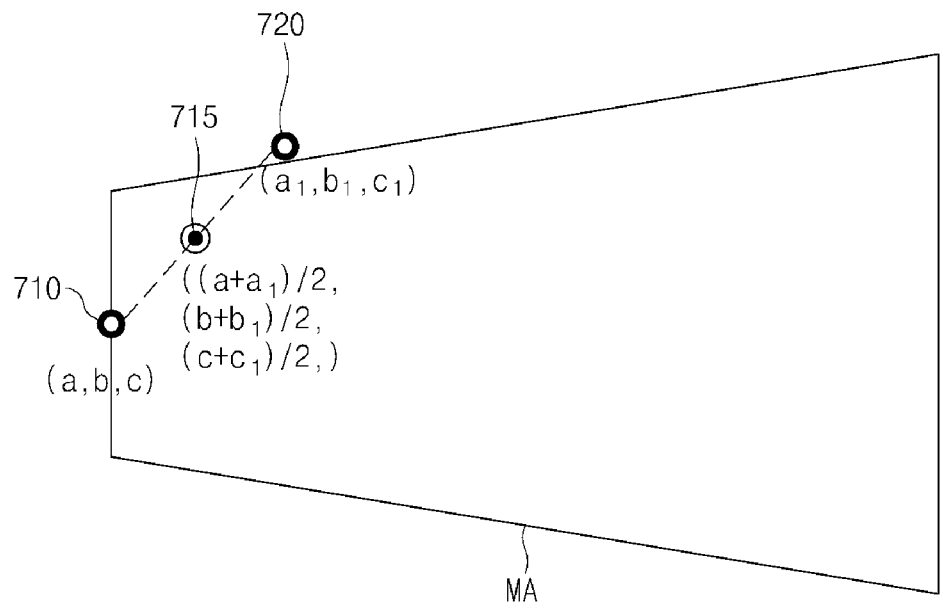
FIG. 7 is a diagram for describing another method for correcting a point according to embodiments of the present disclosure.

FIG. 7 is a diagram for describing another method for correcting a point according to embodiments of the present disclosure. Referring to FIG. 7, the control module 170 may check that only one point 710 is included in the matching area MA. The control module 170 may generate a new virtual point 715 between the point 710 included in the matching area MA and a point 720 next to 710, which is not included in the matching area MA and is checked from the second road information, by using the linear interpolation method. The control module 170 may display the virtual point 715 generated as described above and the point 710 which is checked from the second road information and included in the matching area MA on the viewing area.

According to embodiments, in the case in which all the extracted points are not included in the matching area because the curvature of the road on which the vehicle is being driven is the threshold or more, the control module 170 may generate a guide point capable of guiding the driving direction of the vehicle. In the case in which the point checked from the second road information is not included in the matching area, the control module 170 may check a boundary line of a lane using the image data obtained by the camera 140. The control module 170 may generate the guide point based on the checked boundary line of the lane. In step 27, the control module 170 may display the generated guide point on the viewing area.

Figure 8:
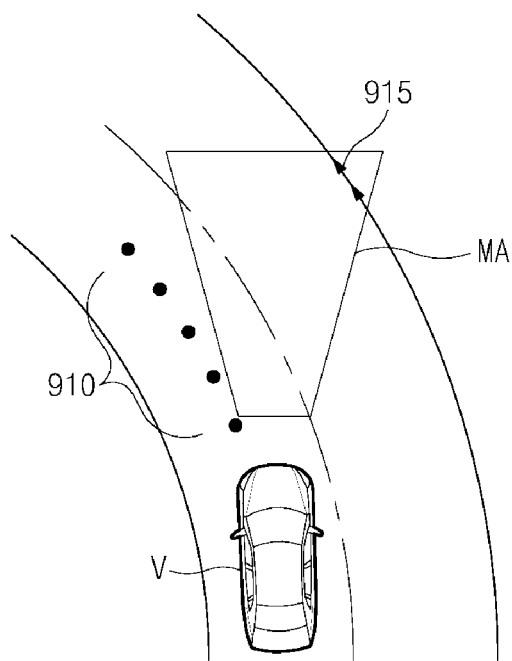
FIG. 8 is a diagram illustrating a screen that a corrected point is output on the viewing area, according to embodiments of the present disclosure.

FIG. 8 is a diagram illustrating a screen that a corrected point is output on the viewing area, according to embodiments of the present disclosure. Referring to FIG. 8, in the case in which all of the extracted points 910 are not included in the matching area MA because the curvature of the road on which the vehicle is being driven is the threshold value or more, the control module 170 may check the boundary line of the lane on which the vehicle is being driven from the image data obtained by the camera 140. The control module 170 may generate a virtual guide point 915 based on the checked boundary line of the lane and allow the virtual guide point to be included in the matching area MA. The control module 170 may display the guide point 915 generated as described above on the viewing area.

As described above, according to embodiments of the present disclosure, the apparatus and the method for controlling the head up display may accurately provide the road information to the driver by outputting the corrected road information on the viewing area by correcting the road information when the road information is not properly displayed on the viewing area due to the curvature of the road on which the vehicle is being driven, the turn of the vehicle, or the like The embodiments of the present disclosure disclosed in the present specification and the accompanying drawings have been provided only as specific examples in order to assist in understanding the present disclosure and do not limit the scope of the present disclosure. Accordingly, it should be interpreted that the scope of the present disclosure is defined by the following claims rather than the above-mentioned detailed description and all modifications or alterations deduced from the meaning, the scope, and equivalences of the claims are included in the scope of the present disclosure.

What is claimed is:

1. An apparatus for controlling a head up display, the apparatus comprising:
a memory configured to store first road information of a road on which a vehicle is being driven;
a camera configured to obtain image data of the road in front of the vehicle;
a control module configured to obtain second road information of the road by analyzing the image data and extracting a plurality of points based on the first road information and the second road information; and
an output module configured to output the plurality of points on a viewing area of a wind shield of the vehicle,
wherein the plurality of points provide a driving guide according to a curvature of the road on which the vehicle is being driven.

2. The apparatus according to claim 1, further comprising:
a sensor module including a location sensor checking location information of the vehicle.

3. The apparatus according to claim 2, wherein the control module is further configured to extract information of the first road information corresponding to the location information and to match the extracted information to the second road information when the first road information and the second road information are not matched.

4. The apparatus according to claim 1, wherein the control module is further configured to check whether one or more points which are not output on the viewing area are present among the plurality of points.

5. The apparatus according to claim 4, wherein the control module is further configured to generate a corrected point by at least one point output on the viewing area when one or more points which are not output on the viewing area are present among the plurality of points.

6. The apparatus according to claim 5, wherein the control module is further configured to control the output module and cause the output module to output the corrected point on the viewing area.

7. A method for controlling a head up display, the method comprising:
extracting first road information of a road on which a vehicle is being driven from prestored road information;
obtaining second road information of the road by analyzing image data of the road in front of the vehicle;
extracting a plurality of points based on the first road information and the second road information; and
outputting the plurality of points on a viewing area of a wind shield of the vehicle,
wherein the plurality of points provide a driving guide according to a curvature of the road on which the vehicle is being driven.

8. The method according to claim 7, further comprising, after the obtaining of the second road information, obtaining location information of the vehicle.

9. The method according to claim 8, further comprising, before the extracting of the plurality of points:
extracting information of the first road information corresponding to the location information; and
matching the extracted information to the second road information when the first road information and the second road information are not matched.

10. The method according to claim 8, wherein the outputting of the plurality of points includes checking whether one or more points which are not output on the viewing area are present among the plurality of points.

11. The method according to claim 10, further comprising, after the checking of whether the one or more points are present among the plurality of points, generating a corrected point by at least one point output on the viewing area when one or more points which are not output on the viewing area are present among the plurality of points.

12. The method according to claim 11, wherein in the outputting of the plurality of points, the one or more points and the corrected point are output on the viewing area.

13. A non-transitory computer readable medium containing program instructions for controlling a head up display, the computer readable medium comprising:
program instructions that extract first road information of a road on which a vehicle is being driven from pre-stored road information;
program instructions that obtain second road information of the road by analyzing image data of the road in front of the vehicle;
program instructions that extract a plurality of points based on the first road information and the second road information; and
program instructions that output the plurality of points on a viewing area of a wind shield of the vehicle,
wherein the plurality of points provide a driving guide according to a curvature of the road on which the vehicle is being driven.

14. The computer readable medium according to claim 13, further comprising program instructions that obtain location information of the vehicle, after the second road information is obtained.

15. The computer readable medium according to claim 14, further comprising program instructions that extract information of the first road information corresponding to the location information and match the extracted information to the second road information when the first road information and the second road information are not matched, before the extracting of the plurality of points.

16. The computer readable medium according to claim 14, further comprising program instructions that check whether one or more points which are not output on the viewing area are present among the plurality of points.

17. The computer readable medium according to claim 16, further comprising program instructions that generate a corrected point by at least one point output on the viewing area when one or more points which are not output on the viewing area are present among the plurality of points, after the checking of whether the one or more points are present among the plurality of points.

18. The computer readable medium according to claim 17, further comprising program instructions that output the one or more points and the corrected point on the viewing area.

* * * * *